United States Patent [19]

Marchant

[11] Patent Number: 4,507,774

[45] Date of Patent: Mar. 26, 1985

[54] OPTICAL DISC AND DISC-TURNTABLE AIR FLOW INTERFACE ASSEMBLY

[75] Inventor: Alan B. Marchant, Rochester, N.Y.

[73] Assignee: Eastman Kodak Company, Rochester, N.Y.

[21] Appl. No.: 474,397

[22] Filed: Mar. 11, 1983

[51] Int. Cl.³ .................. G01D 15/32; G11B 5/52
[52] U.S. Cl. ............................. 369/271; 369/261; 369/284; 369/287; 346/135.1; 346/137
[58] Field of Search ............... 346/137, 135.1; 360/86; 369/261–271, 284, 287

[56] References Cited

U.S. PATENT DOCUMENTS

| | | | |
|---|---|---|---|
| 3,336,583 | 8/1967 | Comstock | 340/174.1 |
| 3,737,880 | 6/1973 | Kelley | 340/174.1 E |
| 3,805,292 | 4/1974 | Hashiguchi et al. | 360/135 |
| 3,947,888 | 3/1976 | Jarsen | 360/103 |
| 4,334,302 | 6/1982 | Peppers | 369/261 X |
| 4,358,843 | 11/1982 | Rager | 369/261 X |
| 4,365,258 | 12/1982 | Geyer et al. | 346/137 |

FOREIGN PATENT DOCUMENTS 723671  3/1980  U.S.S.R. ........................ 369/261

*Primary Examiner*—E. A. Goldberg
*Assistant Examiner*—Gerald E. Preston
*Attorney, Agent, or Firm*—Warren W. Kurz

[57] ABSTRACT

Optical disc write/read apparatus and systems of the type having a flexible record disc and turntable which interface in a manner forming a generally enclosed space between record portions of the disc and opposing turntable portions is provided with inner and outer ventilation means which effect a continuous, controlled air flow through said space during write/read operations.

17 Claims, 15 Drawing Figures

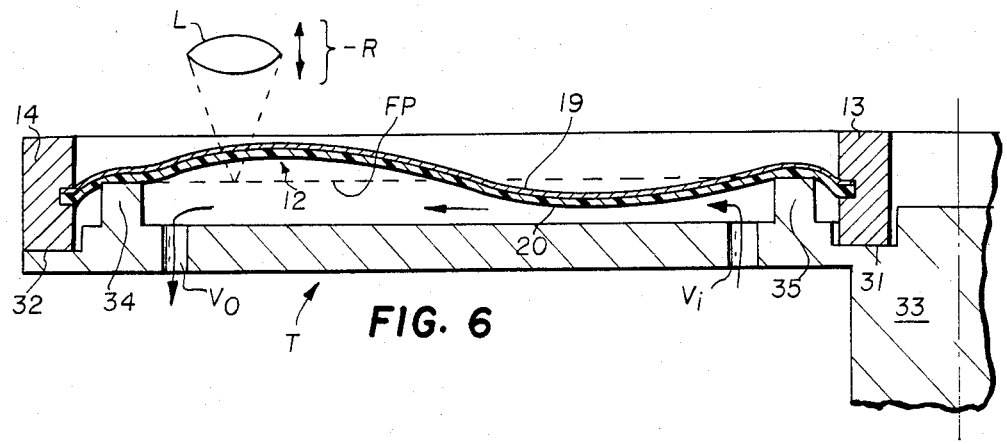
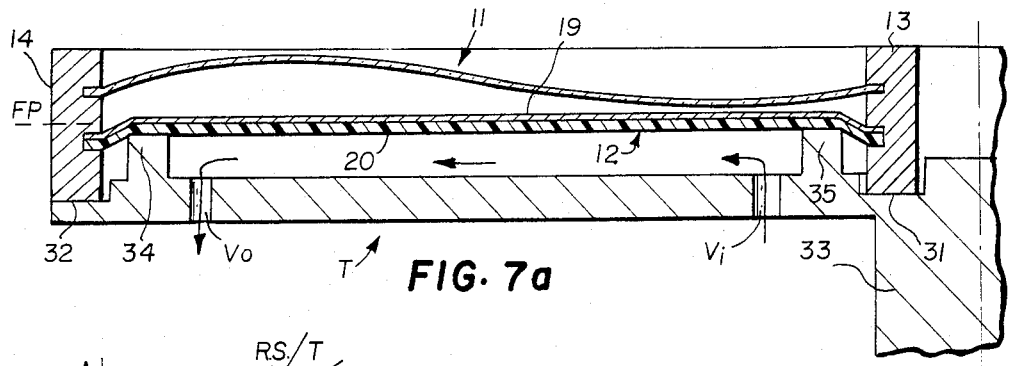
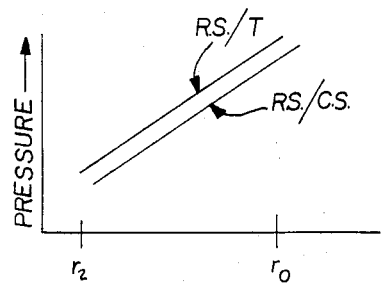
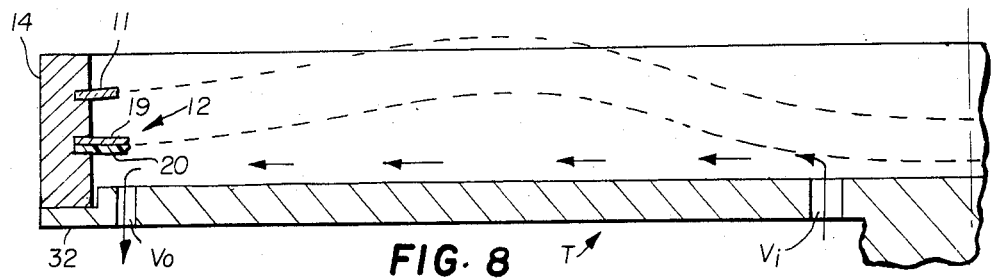

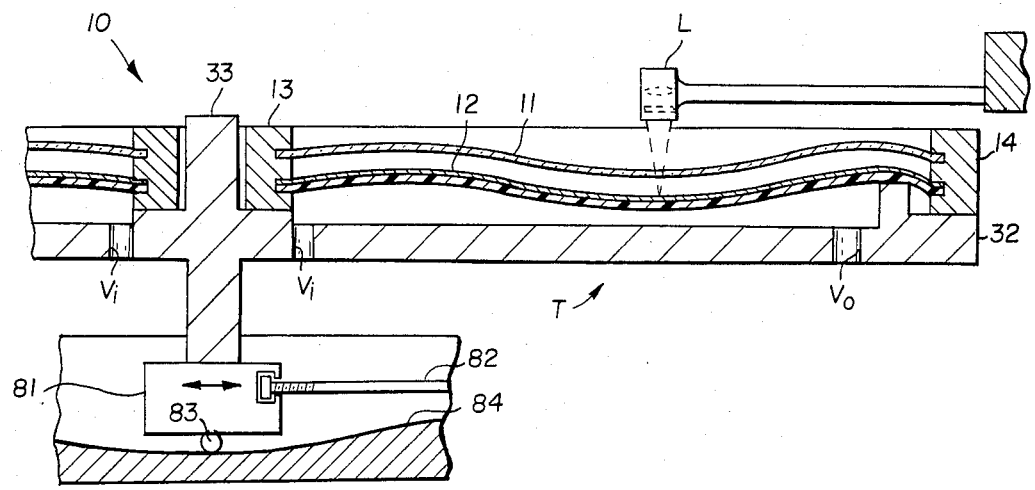
FIG. 9
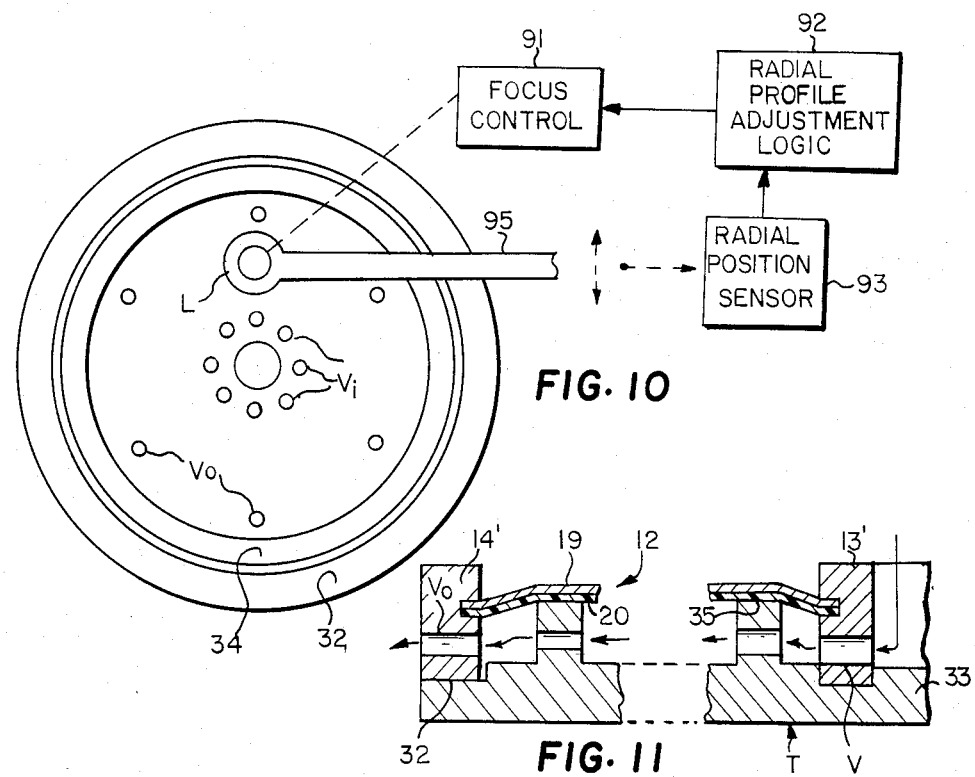
FIG. 10
FIG. 11

OPTICAL DISC AND DISC-TURNTABLE AIR FLOW INTERFACE ASSEMBLY

BACKGROUND OF THE INVENTION

1. Field of the Invention

The present invention relates to optical disc write and/or read (hereinafter write/read) apparatus which rotate edge-constrained discs and more specifically to improve disc-turntable interface constructions of such apparatus.

2. Brief Description of Prior Art

U.S. Pat. No. 4,365,258 issued Dec. 21, 1982 to Geyer and Leonard, discloses configurations for optical disc units and cooperative write/read apparatus that provide significant advantages in using flexible optical discs. In one disclosed disc unit configuration a flexible record disc and a flexible disc cover are engaged around annular peripheral regions to uniformly tension the disc and its cover in spaced relation. In some embodiments the tension is sufficient to provide a relatively smooth and flat disposition of the record disc and the peripheral support structure of the disc unit cooperates with turntable structure of the write/read apparatus to accurately position the record disc with respect to the apparatus write/read lens. In other embodiments the apparatus turntable comprises an annular abutment surface which contacts an annular region of a mounted record disc to accurately position the record disc with respect to the write/read lens.

In both of the above embodiments it is preferable to have a space between at least the record zone portion (i.e. the annular portion between the outer periphery and center where write/read occurs) of the record disc and adjacent turntable portions. That is, it is advantageous not to have contact between any record zone portion of the record disc and opposing turntable portions because contact could cause disruptions in the smooth and flat disposition that is desired.

The above described disc-unit/apparatus configurations perform admirably. However, there are certain features of these systems where improvements might be desired for some applications. For example, during rotation an air pressure variation develops radially within the sealed disc unit and within the enclosed space which exists between the record disc and turntable portions that are radially interior of the edge support or abutment surfaces. That is, centrifugal force on the air in these enclosed spaces causes relatively higher pressure (e.g. above ambient) at radially exterior zones and relatively lower pressure (e.g. sub-ambient) at radially interior zones. Without air leakage from either air region, such radial pressure variations are predictable for a given configuration, and are generally equal on opposite sides of the record disc. The flexible record disc and the disc cover experience limited deflections according to the radial pressure distribution within the rotating sealed disc unit (bending slightly above its stationary position at outer radii and slightly below its stationary position at inner radii).

Such predictably limited deflections can be accommodated by the acquisition range of the write/read lens. However, if air leakage occurs at some portion of the disc-turntable interface, the radial pressure distribution within the enclosed region between the turntable and the record disc can differ more drastically from that within the rotating sealed disc unit. Accommodation of the resulting record disc deflections becomes much more difficult. Such deflections are not predictable because they depend on the location and extent of the leakage. The leakage may occur gradually or suddenly during write/read operation. Gradual leakage at best extends the required acquisition range of the write/read lens. Sudden changes of the record disc position can cause inaccuracy in the write/read operation. Moreover, since the leakage-caused deflections are transmitted to the disc-unit cover sheet, a sudden leakage can cause a crash between the cover sheet and the write/read lens.

By careful tolerancing of the disc-unit turntable interface structure (e.g. the peripheral support structure, the annular abutment surface and the center hub structure, if used), the problems of air leakages can be avoided. However, it is desirable, particularly with respect to fabrication of the disc unit, that highly precise tolerances not be required.

SUMMARY OF THE INVENTION

One object of the present invention is to provide optical disc write/read systems having improved constructions which reduce or avoid problems such as described above by controlling the deflections of such flexible discs during use. An important advantage of the present invention is that it comprises a structurally and functionally simple technique for improving write/read operations using flexible optical discs of the kind described above. Another advantage of the present invention is that disc deflections can be controlled to a generally predetermined orientation which minimizes the acquisition range of the write/read optics.

In one aspect the present invention achieves the above and other objects and advantages by providing, in write/read apparatus, improved turntable construction for use with edge-constrained optical discs, e.g. sealed disc-units such as described above. In one preferred embodiment such turntable construction includes means to receive an optical disc unit, a wall portion located for spaced, opposing relation to the record zone of a received disc unit (thus defining a generally enclosed region therebetween) and radially inner and outer ventilation means constructed and located in the wall portion to allow predetermined air flow into and out of the generally enclosed region.

In another aspect the present invention provides an optical disc write/read system which includes such improved turntable construction and a cooperative optical disc unit. In another aspect the invention provides such a system wherein the optical disc unit includes radially inner and/or outer ventilation means for effecting such controlled air flow during rotation. Certain preferred embodiments of the present invention provide structure for minimizing peak to peak deflection ranges of edge-constrained record discs. Other preferred embodiments of the present invention provide turntable constructions for controlling the radial profile of such record discs and means responsive to the radial positions of the write/read optics relative to a received disc unit, for adjusting the nominal position of the write/read optics in accordance with such radial profile.

BRIEF DESCRIPTION OF DRAWINGS

The subsequent description of preferred embodiments of the invention refers to the attached drawings wherein:

FIG. 6 is a schematic cross-sectional view of a portion of one turntable and disc unit construction in accord with the present invention;

FIG. 7A is a schematic cross-sectional view of a portion of another turntable and disc unit construction in accord with the present invention;

FIG. 7B is a graph illustrating radial pressure distributions within portions of the FIG. 7A embodiment;

FIG. 8 is a schematic cross-sectional view of another embodiment of the present invention;

FIG. 9 is a cross-sectional view of an optical disc write/read apparatus schematically illustrating an exemplary write/read lens adjustment configuration in accord with the present invention;

FIG. 10 is a plan view of an optical disc write/read apparatus schematically illustrating another exemplary write/read lens adjustment construction in accord with the present invention; and FIG. 11 is a schematic cross-sectional view of another embodiment of the present invention.

DETAILED DESCRIPTION OF PREFERRED EMBODIMENTS

Figure 1:
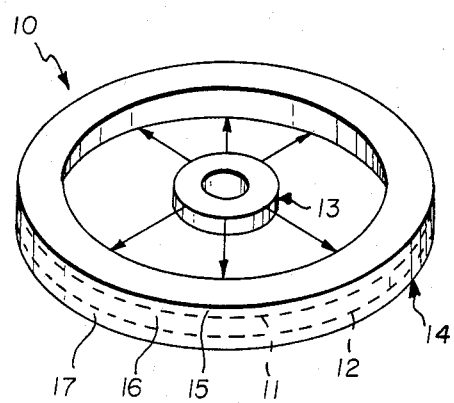
FIG. 1 is a perspective view of one embodiment of optical disc unit useful in accord with the present invention.
Figure 2:
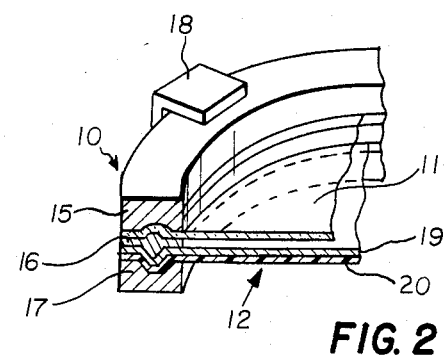
FIG. 2 is an enlarged perspective view of a portion of the FIG. 1 unit.

FIGS. 1 and 2 show an exemplary embodiment of the kind of optical disc units described in aforementioned U.S. Pat. No. 4,365,258. The illustrated optical disc unit 10 comprises a cover disc 11 and a record disc 12 which are supported in cylindrically symmetric tension by inner and outer annular retaining means 13 and 14. As shown in more detail in FIG. 2 the retaining means can comprise top, intermediate and bottom ring members 15, 16 and 17 held together, e.g. by clamp means 18, so as to grip peripheral portions of the cover disc and record disc. The record disc can comprise a record layer 19 (e.g. a heat deformable, dye binder layer) overlying a reflectively surfaced support 20. The material characteristics and further construction details for these kinds of disc units are set forth in the above-mentioned patent, which is incorporated herein by reference for that purpose and for its disclosure of a variety of additional examples of disc unit configurations with which the present invention is useful. In general, the present invention has significant advantage with all disc unit configurations described in that patent and with other similar disc unit configurations wherein a flexible record disc (or flexible record disc and cover disc combination) are adapted for disposition on write/read apparatus with an edge constraint that blocks or impedes the radially outward flow of air between the record disc and the apparatus turntable. As discussed previously, the present invention is particularly advantageous in embodiments where the radial pressure distribution caused by disc rotation is subject to change, e.g. as can be caused by leakage into and/or out of a space between the apparatus turntable and the record disc.

As indicated above the present invention is useful with flexible optical disc units which have only an edge constrained record disc as well as such units which have a record disc and cover disc. Although certain general principles are applicable to both disc unit types, specific optimizing design features of the present invention differ depending on whether a record-disc-only unit or a record-disc/cover-disc unit is to be used. Because the basic principles of operation may be more easily understood with respect to a record-disc-only unit system, it will be described first and preferred record-disc/cover-disc systems will be described subsequently.

Figure 3A:
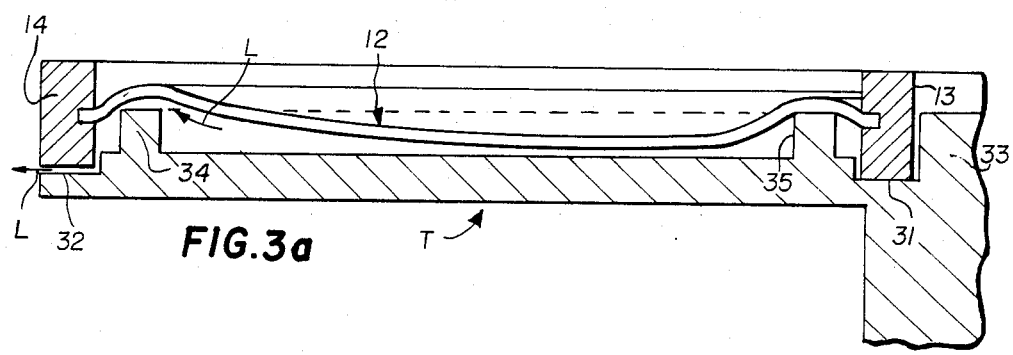
FIGS. 3A, 4A and 5A are diagrams useful in explaining the present invention.
Figure 3B:
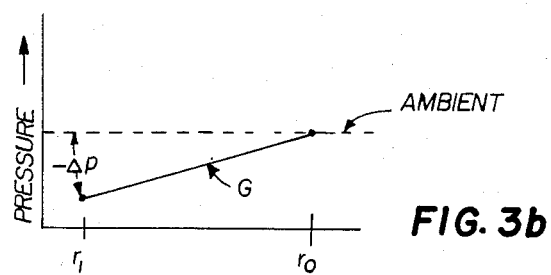
FIGS. 3B, 4B, and 5B are graphs indicating radial pressure distributions corresponding respectively to disc-turntable interface regions shown in FIGS. 3A, 4A, and 5A.
Figure 4A:
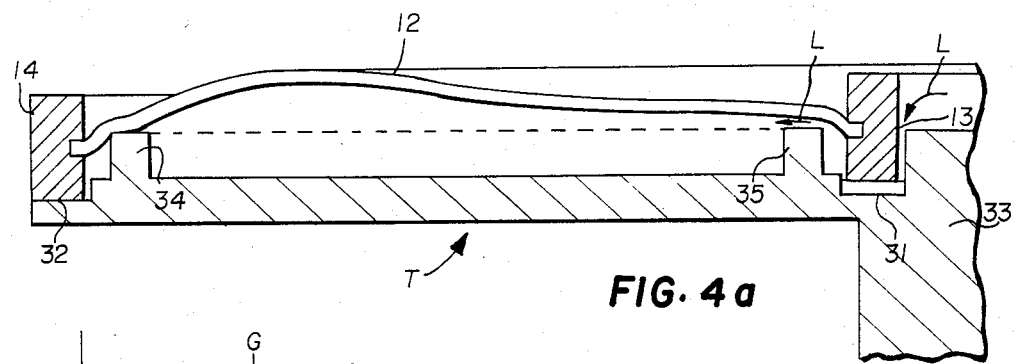

FIGS. 3A and 4A schematically illustrate the nature of two typical air leakage conditions and the resulting record disc deflection which they cause. Thus in FIG. 3A a disc unit 10 (with only a record disc element) is shown mounted on turntable T. The turntable includes receiving means 31 and 32 for the annular retaining means 13 and 14 of the disc unit, a centering spindle 33 and annular abutment surfaces 34 and 35 for engaging non-record-zone portions and locating record-zone portions of the record disc 12. In the FIG. 3A illustration the air leakage, shown by arrows L, is from the outer portion of the region between turntable T and the record disc 12, such as might be caused by imperfect seating of the outer retaining means 14. FIG. 3B illustrates the resulting radial pressure distribution curve G (herein termed the "pressure gradient") across the region between illustrative inner and outer radial positions (proximate abutment surfaces 35 and 34). FIG. 3B also shows the relation of such pressure gradient G to ambient pressure surrounding the disc unit and turntable. It can be seen that the FIG. 3A leakage condition results in generally ambient pressure near the outer radial portion of the generally enclosed disc-turntable region and a substantially sub-ambient pressure near the inner radial portion of that region. As shown in FIG. 3A the resulting record disc deflection profile is generally proportional to the pressure differential between ambient pressure and pressure gradient G, and a peak deflection proportional to pressure differential $-\Delta_p$ will occur near the illustrative inner radial portion.

Figure 4B:
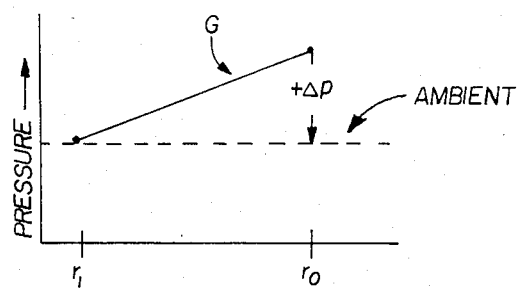

FIGS. 4A and 4B indicate, in a similar manner, the pressure gradient G and resulting record disc deflection profile caused by air leakage at an inner radius of the disc unit/turntable interface (such as can be caused, e.g. by imperfect seating of retaining means 13 in receiving means 31). A peak deflection proportional to pressure differential $+\Delta_p$ occurs near the illustrative outer radial portion.

Figure 5A:
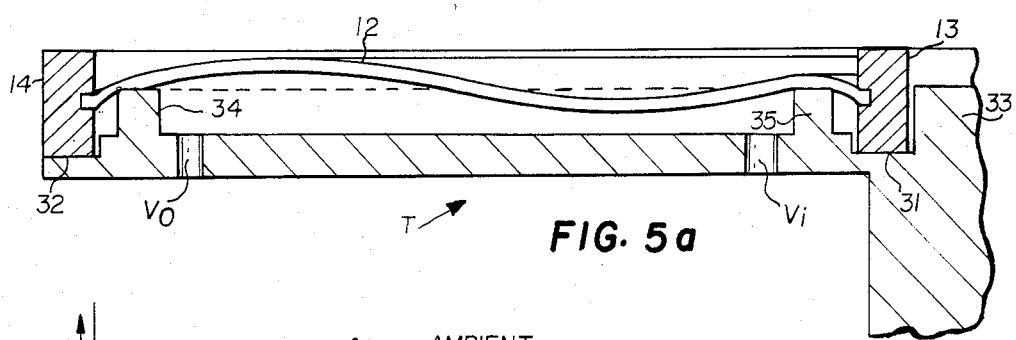
Figure 5B:
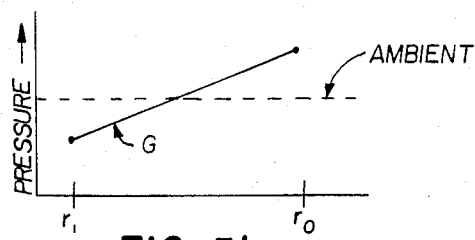

FIGS. 5A and 5B illustrate the control of the deflection profile of record disc 12 that is attained in accord with one embodiment of the present invention. Thus when appropriate inner and outer ventilation means $V_i$ and $V_o$ are provided (from ambient pressure to the record disc/turntable interface region), the radial pressure gradient G of the region can be controlled so as to be generally centered (or straddling) with respect to ambient pressure. Again, the deflection profile of the record disc 12 is generally proportional to the pressure gradient and one significant advantage of the present invention can be understood from a further consideration of FIGS. 3-5. Because the pressure gradient of the FIGS. 5A-5B system straddles the ambient pressure, the total pressure differential between the boundary condition pressures $-\Delta_p$ and $+\Delta_p$ (at $r_i$ and $r_o$) of the FIG. 5A system is about one-half the differential between the pressure at $r_i$ in the FIG. 3B leakage condition and the pressure at $r_o$ in FIG. 4B leakage condition. A write/read lens system without the FIG. 5A ventilation means must accommodate both the FIGS. 3B and 4B leakage conditions and a resulting greater peak-to-peak deflection range. Because the distance of the effective curvatures of the FIG. 5A system are about one-half those in FIGS. 3A and 4A a further improvement in peak-to-peak deflection is attained by the FIG. 5A system. Thus a significant decrease in acquisition range is provided by this embodiment of the present invention; however, of equal importance is the fact that the FIG. 5A system yields the illustrated profile in a predictable manner, immediately after start up. Sudden changes in record disc profile are obviated.

Criteria for constructing ventilation means $V_i$ and $V_o$ in accord with the present invention can be described with respect to FIG. 6, which shows more detail (with numerals corresponding to FIG. 5A) of the disc unit 10 mounted on turntable T. Initially, however, it should be noted that, for illustrative purposes, the relative sizes of the disc-unit structure and the record disc deflections are greatly enlarged relative to the turntable in all Figures. As shown in FIG. 6, during rotation of turntable T centrifugal forces cause air to flow into the region between support 20 of record disc 12 and the upper surface of the turntable (see arrow at $V_i$), radially outwardly, and exit at $V_o$ as illustrated by the arrow path. By control of air flow from $V_i$ to $V_o$ in the FIG. 6 embodiment (thus the pressure gradient between $V_i$ and $V_o$ beneath support 20 and thus the deflection of record disc 12), the acquisition range R (which write/read lens L must cover during radial indexing to various tracks on the disc) will predictably be the sum of the peak deflection of record layer 19 above the nominal focal plane F.P. and the peak deflection below the nominal focal plane F.P.

Several general factors should be considered in construction of the ventilation means. First, it is highly preferred that the effective cross-sectional air-flow area of the inner and outer ventilation means be, e.g., about 10 times greater than the area of any expected uncontrolled leakage. The effective air-flow area of a ventilation means, such as the cylindrical passages through the turntable shown in FIG. 6, is the minimum cross-sectional area of the passage (or cumulative minimum cross-sectional areas of a group of passages) which comprise that ventilation means. To assure rapid equilibration at the beginning of disc rotation it is preferred that each of the inner and outer ventilation means have an effective air-flow area greater than about 1 mm$^2$. Further, to avoid turbulence and noise during operation, it is highly desirable that the total combined cross-sectional areas of both ventilation means at the lower surface of the turntable be small compared to lower surface area of the turntable in which they are formed, e.g. no more than about 1% of such lower turntable surface. Also, the locations of the ventilation means are important because they define the boundaries of the controlled pressure gradient. In preferred embodiments the inner and outer ventilation means are located respectively proximate the inner and outer boundaries of the record zone of the record disc 12. Preferred configurations for the ventilation means are cylindrical passages generally normal to the surface of the turntable; however, other configurations are useful. For example it may be useful to taper and/or slant the passages through the turntable.

Now considering desirable and preferred relative size ratios for the ventilation means of the FIG. 6 (record-disc-only) embodiment, it is desirable that relative sizes and locations of the inner and outer ventilation means $V_i$ and $V_o$ cause the pressure excess (above ambient) of the disc-turntable region near the radially outer ventilation means to be about equal to the pressure deficit (below ambient) of the disc-turntable region near the radially inner ventilation means. As an approximating guideline the effective air-flow area of said inner ventilation means usefully is at least about 30% larger than that of said outer ventilation means. For a 1:2 relative radial placement, the effective air-flow area of the inner ventilation means is preferably about 50% larger than the effective air-flow area of the outer ventilation means. This ratio of effective air-flow areas can be implemented by a difference in size of the individual turntable passages (as shown in FIG. 6) and/or by a difference in the number of passages which comprises the respective inner and outer ventilation means (see e.g. FIG. 10 where eight symmetrically disposed passages form the inner ventilation means and six similarly sized and symmetrically disposed passages form the outer ventilation means).

Now, refer to the record-disc/cover-disc unit shown in FIG. 7A. In this embodiment the upper boundary pressure condition for the record disc 12 is defined by the sealed space between the cover disc 11 and the record disc 12. In such embodiments one preferred approach for choosing relative ventilation means sizes is to minimize the differential between the pressure gradient in the record-disc/cover-disc zone (curve "R.S./C.S." in FIG. 7B) and the pressure gradient in the record-disc/turntable zone (curve "R.S./T." in FIG. 7B). The relative size of inner and outer ventilation means to accomplish this precisely depends on specific disc unit characteristics, e.g. the tension of the cover disc and the spacing between the cover disc and record disc. However, again a useful general guideline is to construct the ventilation means so that the pressure deficit (with respect to ambient) proximate the inner end of ventilation means passage(s) $V_i$ is of the same general magnitude as the pressure excess (with respect to ambient) proximate the inner end of ventilation means passage(s) $V_o$. The other general factors mentioned above with respect to ventilation means sizes and shapes also apply with respect to the FIG. 7A embodiment.

As shown in FIG. 7A, when the pressure distribution in the turntable/record disc zone is approximately the same as that in the cover-disc/record-disc zone the record disc attains an approximately flat radial profile. This is highly desirable for most applications. If it is desired to minimize spacing between the record disc and cover disc during use (e.g. to decrease the lens working distance) the pressure gradient R.S./T. can be slightly above R.S./C.S. as shown in FIG. 7B.

As one illustrative example of the present invention, a disc unit such as shown in FIG. 7A, having a diameter of about 35 cm, was rotated at 1800 rpm on a turntable constructed with eight 1/16" diameter holes located at 7 cm radii and six 1/16" diameter holes located at 14 cm radii. Abutment surfaces (such as 34 and 35 in FIG. 7A) were located at radii of 14.5 cm and 4.0 cm respectively. The resultant deflection (peak to peak) of the record disc was approximately 5 times less than the peak-to-peak deflection experienced when such discs were used on turntables without the present invention.

FIG. 8 illustrates a turntable embodiment which is similar to FIG. 7A but adapted for a disc unit which has no center hub. The FIG. 8 embodiment also illustrates the mode of record disc positioning which relies on the interface of retaining means 14 and receiving means 32 to position the record disc 12 relative to the write/read lens. That is, no abutment means are provided on the turntable T of the FIG. 7A embodiment. In this embodiment the ventilation means $V_o$ and $V_i$ are desirably located in the turntable T proximate the receiving means 32 and the turntable shaft, rather than proximate but interior of the abutment means as shown in FIG. 7A.

As explained above, the present invention provides that the record disc 12 will assume a predictable radial profile. FIGS. 9 and 10 illustrate other exemplary aspects of the present invention whereby predictable-profile characteristic can be utilized to further advantage. Thus in FIG. 9, the turntable T and its motor 81 are translated by helical screw 82 with respect to lens L to effect radial (track to track) indexing of the rotating disc unit 10. As the turntable assembly translates, roller 83 follows cam path 84 to adjust the turntable to lens spacing. By selecting the cam configuration to conform to the controlled radial profile of a disc unit/turntable system, variation in the lens to record-disc spacing can be minimized. This further decreases the active acquisition range requirements for the write/read lens L. It will be appreciated that other equivalent mechanical adjustment of the turntable to lens spacing can be effected, e.g. by having lens L follow such a cam surface rather than the turntable.

In FIG. 10, a programmed lens adjustment is imposed on the focus control circuit 91 of write/read system 90, e.g. as a DC signal which is generated by logic 92 in response to radial position sensor 94. Thus, as the index arm 95 for lens L move radially, a radial position signal from position sensor 93 is input to logic 92 (e.g. a ROM which has outputs of predetermined DC signals based on the expected record disc profile at given radii). The outputs of unit 92 can be combined with dynamic focus control signals (e.g. from a focus control servo, not shown).

Another useful embodiment of the invention is shown in FIG. 11. In this embodiment inner and outer passages V and $V_o$ are provided in the retaining means of the optical disc unit rather than through the turntable wall. In turntable embodiments wherein abutment surfaces 34 and 35 are provided, it is preferred to provide passages 34' and 35' to allow radially outward flow of air as indicated by the arrows in FIG. 11.

The invention has been described in detail with particular reference to preferred embodiments thereof, but it will be understood that variations and modifications can be effected within the spirit and scope of the invention.

What is claimed is:

1. An optical disc write/read system of the type comprising: (a) an optical disc unit including a flexible record disc having an annular record zone, and (b) a turntable for receiving such disc unit in a manner forming: (i) a barrier to air-flow at a radially outer interface between said turntable and said flexible disc record and (ii) a generally enclosed space between portions of said turntable and the disc record zone, characterized in that said system includes radially inner and outer ventilation means constructed and located for allowing a continuous, controlled air-flow radially outwardly through said space during rotation of said turntable.

2. The invention defined in claim 1 wherein the effective air-flow area of said inner ventilation means is larger than the effective air-flow area of said outer ventilation means.

3. The invention defined in claim 1 wherein said inner and outer ventilation means respectively comprise radially inner and radially outer passage means through said turntable.

4. The invention defined in claim 1 wherein said ventilation means includes aperture means in said optical disc unit.

5. The invention defined in claim 1 wherein said turntable includes abutment means for uniformly tensioning said record disc and wherein said ventilation means include aperture means in said abutment means and in said optical disc unit.

6. The invention defined in claim 1 wherein said disc unit further includes a flexible, disc-shaped cover sheet which is substantially transparent to write/read wavelengths and which is generally coextensive with said record disc; and annular retaining means, engaging said record disc and said cover sheet substantially continously around outer peripheral regions, for positioning the disc and sheet in spaced relation.

7. An optical disc write/read apparatus adapted for use with an optical disc unit comprising (i) a flexible record disc having a record zone on an interior annular portion; and (ii) an annular retaining means constraining said record disc around an outer peripheral portion so as to uniformly tension the record disc into a generally flat condition, said apparatus comprising a turntable having (a) a rotatable planar surface; (b) interface means for engaging an outer zone of such a disc unit to accurately position the record zone of such record disc at a location spaced from said planar surface, said interface means forming a barrier to the radially outward flow of air between the record disc and said planar surface; and (c) radially inner and outer ventilation means constructed and located in said planar surface for allowing predetermined air flow respectively into and out of the space between the record disc and said planar surface.

8. The invention defined in claim 7 wherein said inner ventilation means has an effective air-flow area larger than the effective air-flow area of said outer ventilation means.

9. The invention defined in claim 7 wherein said interface means includes abutment means for uniformly tensioning and accurately locating said flexible disc and wherein said ventilation means include aperture means in said abutment means.

10. The invention of claim 7 wherein each of said ventilation means comprises a plurality of holes spaced generally equidistantly around a respective annular zone of said turntable.

11. The invention of claim 7 wherein the cross-sectional area of said ventilation means in said planar surface is not greater than 1% of the area of said planar surface.

12. An optical disc unit which: (1) includes a flexible, edge-constrained, record disc having an annular record zone and (2) is adapted for use with write/read apparatus having a turntable which receives such disc unit in a manner forming (i) a barrier to air-flow at a radially outer interface between the turntable and the disc unit and (ii) a space between radially inner portions of the turntable and the disc record zone, characterized in that said disc unit includes ventilation means constructed and located for allowing a continuous, controlled air-flow radially outwardly through said space during write/read rotation of the disc unit with such turntable.

13. The invention of claim 12 wherein said disc unit includes radially inner and radially outer ventilation means and said inner ventilation means has an effective air-flow area larger than the effective air flow area of said outer ventilation means.

14. The invention of claim 13 wherein said inner and outer ventilation means have effective air-flow areas of different size such that, during nominal turntable rotation, there is a predetermined pressure deficit, with respect to ambient pressure, within said space proximate said inner ventilation means and a pressure excess, generally equal magnitude to said pressure deficit, within said space region proximate said outer ventilation means.

15. The invention of claim 13 wherein said inner ventilation means is proximate the inner boundary of such disc record zone and said outer ventilation is proximate the outer boundary of such disc record zone.

16. The invention of claim 13 wherein the effective air-flow area of said inner ventilation means is at least 30% larger than said area of said outer ventilation means.

17. The invention of claim 13 wherein each of said ventilation means has an effective air-flow area greater than 1 mm$^2$.

* * * * *